United States Patent
Yang et al.

(10) Patent No.: US 10,402,012 B2
(45) Date of Patent: Sep. 3, 2019

(54) DRIVING METHOD FOR IN-CELL TOUCH DISPLAY AND MOBILE DEVICE USING THE SAME

(71) Applicant: FOCALTECH ELECTRONICS, LTD., Grand Cayman (KY)

(72) Inventors: Ho-Nien Yang, Grand Cayman (KY); Shen-Chia Huang, Grand Cayman (KY)

(73) Assignee: Focaltech Electronics, Ltd., Grand Cayman (KY)

( * ) Notice: Subject to any disclaimer, the term of this patent is extended or adjusted under 35 U.S.C. 154(b) by 245 days.

(21) Appl. No.: 15/237,037

(22) Filed: Aug. 15, 2016

(65) Prior Publication Data

US 2017/0269781 A1    Sep. 21, 2017

(30) Foreign Application Priority Data

Mar. 16, 2016 (TW) .............. 105108016 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01)

(58) Field of Classification Search
CPC .... G06F 3/0418; G06F 3/0416; G06F 3/0412; G06F 3/044
See application file for complete search history.

(56) References Cited

U.S. PATENT DOCUMENTS

2015/0309661 A1* 10/2015 Kim ..................... G06F 3/0418
345/174

FOREIGN PATENT DOCUMENTS

| CN | 101907960 A | 12/2010 |
|---|---|---|
| CN | 101937282 A | 1/2011 |
| CN | 104808862 A | 7/2015 |
| TW | 201007536 A | 2/2010 |
| TW | 201344526 A | 11/2013 |
| TW | I417624 B | 12/2013 |
| TW | I437478 B | 5/2014 |

* cited by examiner

*Primary Examiner* — Rodney Amadiz
(74) *Attorney, Agent, or Firm* — Muncy, Geissler, Olds & Lowe, P.C.

(57) ABSTRACT

A driving method for an in-cell touch display and a mobile device using the same are provided. The driving method for an in-cell touch display comprises the steps of: dividing a frame period into N display/touch detection sub-periods each comprising a display sub-period and a touch detection sub-period; dividing scan lines into M scan-line sets, wherein a position of each of the scan-line sets corresponds to at least one of touch sensors; supplying a display common voltage to the touch sensor corresponding to the $I^{th}$ scan-line set when the scan line being scanned in the display sub-period of the $K^{th}$ display/touch detection sub-period comprises the scan line of the $I^{th}$ scan-line set, wherein N, M, K and I are natural numbers, K is smaller than or equal to N, and I is smaller than or equal to M.

6 Claims, 15 Drawing Sheets

DRIVING METHOD FOR IN-CELL TOUCH DISPLAY AND MOBILE DEVICE USING THE SAME

This application claims priority of No. 105108016 filed in Taiwan R.O.C. on Mar. 26, 2016 under 35 USC 119, the entire content of which is hereby incorporated by reference.

BACKGROUND OF THE INVENTION

Field of the Invention

The invention relates to the technology of an in-cell touch display, and more particularly to a driving method for an in-cell touch display and a mobile device using the same for solving the problem of the too long settling time upon switching between touch and display periods.

Description of the Related Art

In the existing architecture of an in-cell touch panel, a common voltage electrode VCOM required for the display panel is mainly divided into M×N small electrodes. Each small electrode may function as a touch sensor. Upon touch scanning, each display frame period is divided into several time slots. FIG. 1 is a timing chart showing an operation of a conventional in-cell touch display. As shown in FIG. 1, one frame period TFRAME is divided into time slots TP for touch sensors and time slots DP for display-scan. When the time slot TP for the touch sensor is converted into the time slot DP for display-scan, the common voltage electrode VCOM must have the direct current (DC) level (usually the negative voltage) due to the display-scan time. Therefore, all the small electrodes need to be charged to the negative DC voltage in the time slot DP for display-scan. At this time, the load to be driven by the touch drive circuit is the common voltage electrode VCOM of the overall touch display panel (M×N×each load of the electrode of the common voltage electrode VCOM). The above-mentioned load is relatively large, so the settling time (e.g., ST) for the common voltage electrode VCOM is usually not too short.

However, such driving method causes at least the following defects.

First, as the size of the in-cell touch panel is getting larger and larger, the total load for the common voltage electrode VCOM is getting higher and higher, and the settling time for the common voltage electrode VCOM is getting longer and longer. The display-processing drive integrated circuit needs more line buffers to perform the buffering to go through the settling time.

Second, as the screen resolution of the in-cell touch panel is getting higher and higher, the settling time for the common voltage electrode VCOM is not changed. However, the same settling time needs to correspond to more high-resolution display-scan lines, so that the larger line buffer is required to perform the buffering to go through the above-mentioned settling time. Thus, the area of the drive integrated circuit gets larger.

SUMMARY OF THE INVENTION

An aspect of the present invention is to provide a driving method for an in-cell touch display and a mobile device using the same for solving the problem of the too long settling time upon switching between touch and display periods. Meanwhile, the used line buffers may be decreased, and the size and area of the integrated circuit may be reduced.

In view of this, the present invention provides a driving method for an in-cell touch display. The in-cell touch display comprises an in-cell touch panel. The driving method for the in-cell touch display comprises the steps of: dividing a frame period into N display/touch detection sub-periods each comprising a display sub-period and a touch detection sub-period; dividing scan lines into M scan-line sets, wherein a position of each of the scan-line sets corresponds to at least one of touch sensors; supplying a display common voltage to the touch sensor corresponding to the $I^{th}$ scan-line set when the scan line being scanned in the display sub-period of the $K^{th}$ display/touch detection sub-period comprises the scan line of the $I^{th}$ scan-line set, wherein N, M, K and I are natural numbers, K is smaller than or equal to N, and I is smaller than or equal to M.

The present invention further provides a mobile device. The mobile device comprises an in-cell touch panel and a display-driving and touch integrated circuit. The in-cell touch panel comprises scan lines and touch sensors. The display-driving and touch integrated circuit comprises a plurality of pins which respectively coupled to the scan lines and the touch sensors. When the operation is performed, the frame period is divided into N display/touch detection sub-periods, wherein each of display/touch detection sub-periods comprises a display sub-period and a touch detection sub-period, wherein the scan lines are divided into M scan-line sets, wherein a position of each of the scan-line sets corresponds to at least one of the touch sensors. The display-driving and touch integrated circuit sequentially drives the scan lines in the display sub-period of the display/touch detection sub-periods of the frame period, when the scan lines being scanned by the display-driving and touch integrated circuit in the display sub-period of the $K^{th}$ display/touch detection sub-period comprises the scan line of the $I^{th}$ scan-line set, a display common voltage is supplied to the touch sensor corresponding to the $I^{th}$ scan-line set, wherein N, M, K and I are natural numbers, K is smaller than or equal to N, and I is smaller than or equal to M.

In the driving method for an in-cell touch display and the mobile device according to a preferred embodiment of the present invention, the step of supplying the display common voltage to the touch sensor corresponding to the $I^{th}$ scan-line set when the scan line being scanned in the display sub-period of the $K^{th}$ display/touch detection sub-period comprises the scan line of the $I^{th}$ scan-line set comprises: acquiring an index number of the scan line scanned upon displaying before the display sub-period of the $K^{th}$ display/touch detection sub-period; judging the scan-line set of the scan line being scanned according to the acquired index number of the scan line before the display sub-period of the $K^{th}$ display/touch detection sub-period; and supplying the display common voltage to the touch sensor corresponding to the scan-line set of the scan line being scanned.

The present invention further provides a driving method for an in-cell touch display. The in-cell touch display comprises an in-cell touch panel. The driving method for the in-cell touch display comprises the steps of: dividing a frame period into N display/touch detection sub-periods each comprising a display sub-period and a touch detection sub-period; dividing the touch sensors into M touch sensor sets, wherein a position of each of the touch sensor sets corresponds to neighboring ones of the scan lines; supplying a display common voltage to the touch sensor corresponding to the $I^{th}$ touch sensor set when the scan line being scanned in the display sub-period of the $K^{th}$ display/touch detection sub-period comprises the scan line corresponding to the $I^{th}$ touch sensor set, wherein N, M, K and I are natural numbers, K is smaller than or equal to N, and I is smaller than or equal to M.

The present invention further provides a mobile device. The mobile device comprises an in-cell touch panel and a display-driving and touch integrated circuit. The in-cell touch panel comprises scan lines and touch sensors. The display-driving and touch integrated circuit comprises a plurality of pins which respectively coupled to the scan lines and the touch sensors, wherein the frame period is divided into N display/touch detection sub-periods each comprising a display sub-period and a touch detection sub-period, wherein the touch sensors is divided into M touch sensor sets, wherein a position of each of the touch sensor sets corresponds to neighboring ones of the scan lines. The display common voltage is supplied to the touch sensor corresponding to the $I^{th}$ touch sensor set when the scan line being scanned in the display sub-period of the $K^{th}$ display/touch detection sub-period comprises the scan line corresponding to the $I^{th}$ touch sensor set, wherein N, M, K and I are natural numbers, K is smaller than or equal to N, and I is smaller than or equal to M.

In the driving method for an in-cell touch display and the mobile device according to a preferred embodiment of the present invention, the step of supplying a display common voltage to the touch sensor corresponding to the $I^{th}$ touch sensor set when the scan line being scanned in the display sub-period of the $K^{th}$ display/touch detection sub-period comprises the scan line corresponding to the $I^{th}$ touch sensor set comprises: acquiring an index number of the scan line scanned upon displaying before the display sub-period of the $K^{th}$ display/touch detection sub-period; judging the touch sensor set corresponding to the scan line being scanned according to the acquired index number of the scan line before the display sub-period of the $K^{th}$ display/touch detection sub-period; and supplying the display common voltage to the touch sensor corresponding to the touch sensor set.

The essence of the present invention is to adopt the time-sharing driving method to reduce the number of the touch sensors, to which the display common voltage is supplied in each display sub-period, and to supply the common voltage to the touch sensors within the range of the scanned scan lines. Thus, the load of the display-driving and touch integrated circuit for driving the display common voltage can be reduced, so that the settling time of the display common voltage can be significantly shortened, and the requirement of the line buffers is indirectly decreased. On the other hand, the present invention may also adopt the method of grouping the touch sensors to supply a display common voltage to the corresponding touch sensor set within the range of the scan lines being scanned in each display sub-period. Thus, the load of the display-driving and touch integrated circuit for driving the display common voltage can be reduced, so that the settling time of the display common voltage can be significantly shortened, and the requirement of the line buffers is indirectly decreased.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
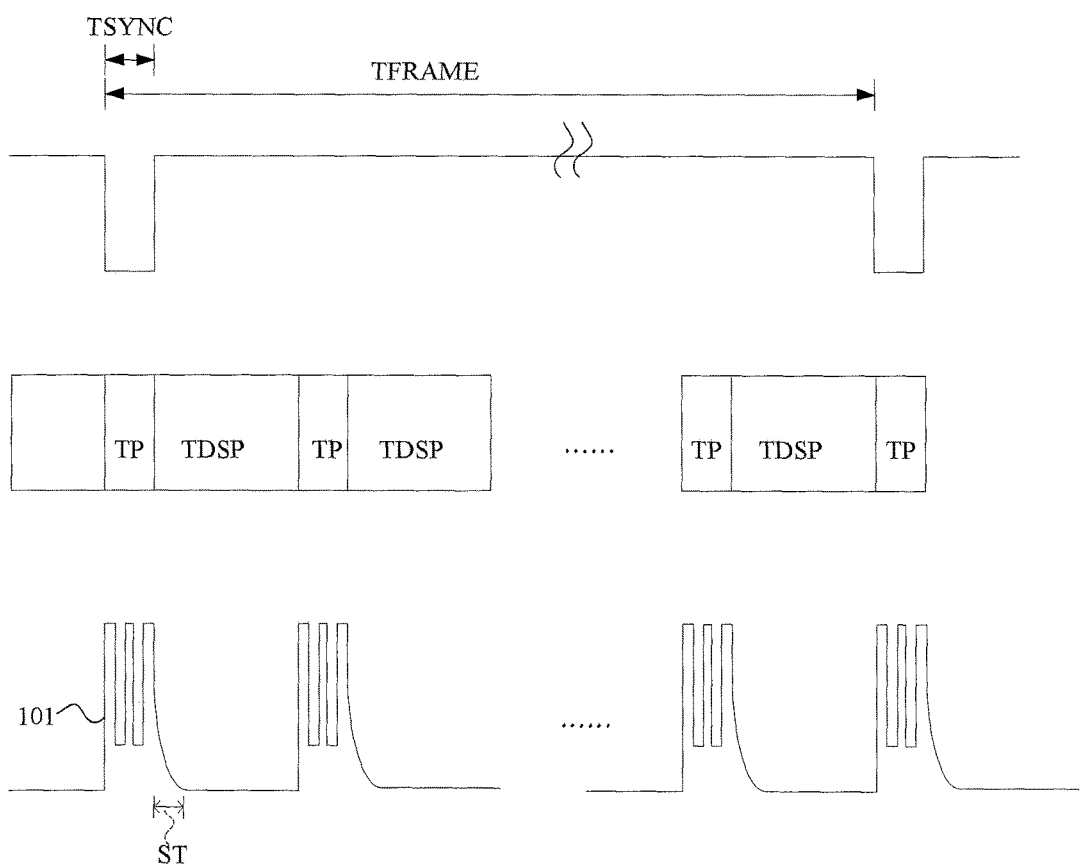
FIG. 1 is a timing chart showing an operation of a conventional in-cell touch display.
Figure 2:
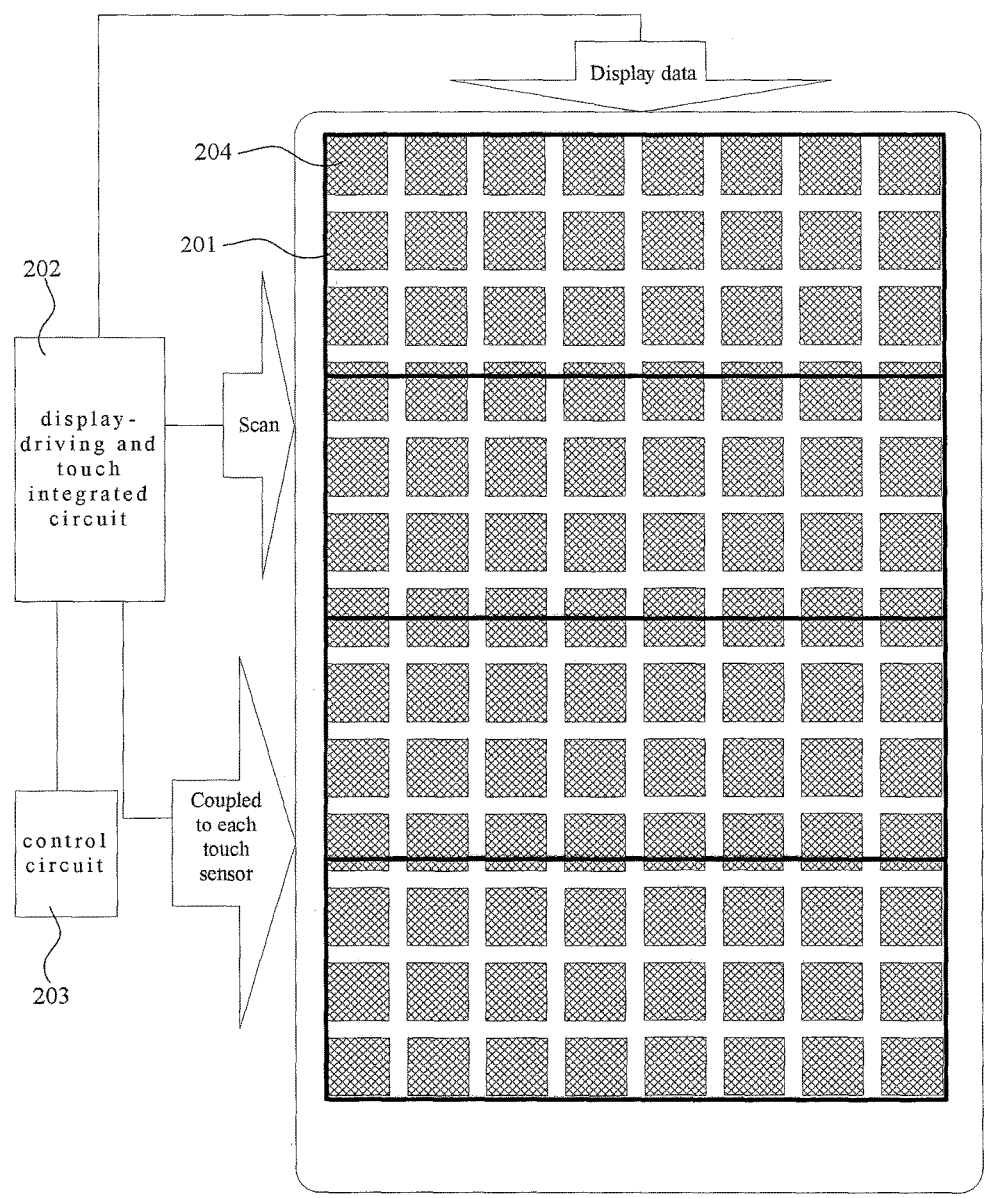
FIG. 2 is a circuit diagram showing a mobile device according to a preferred embodiment of the present invention.

FIG. 2 is a circuit diagram showing a mobile device according to a preferred embodiment of the present invention. Referring to FIG. 2, the mobile device of this embodiment comprises an in-cell touch panel 201, a display-driving and touch integrated circuit 202 and a control circuit 203. The control circuit 203 controls the display-driving and touch integrated circuit 202 to display according to a user's operation. In this embodiment, the in-cell touch panel 201 may comprise, for example, 104 touch sensors 204 (8×13 touch sensors 204). In this embodiment, a self-capacitance touch sensor is described as an example, but the present invention is not restricted thereto. Each touch sensor 204 is coupled to the display-driving and touch integrated circuit 202. In addition, the display-driving and touch integrated circuit 202 further performs the driving of the scan lines and the driving of the display data.

Figure 3:
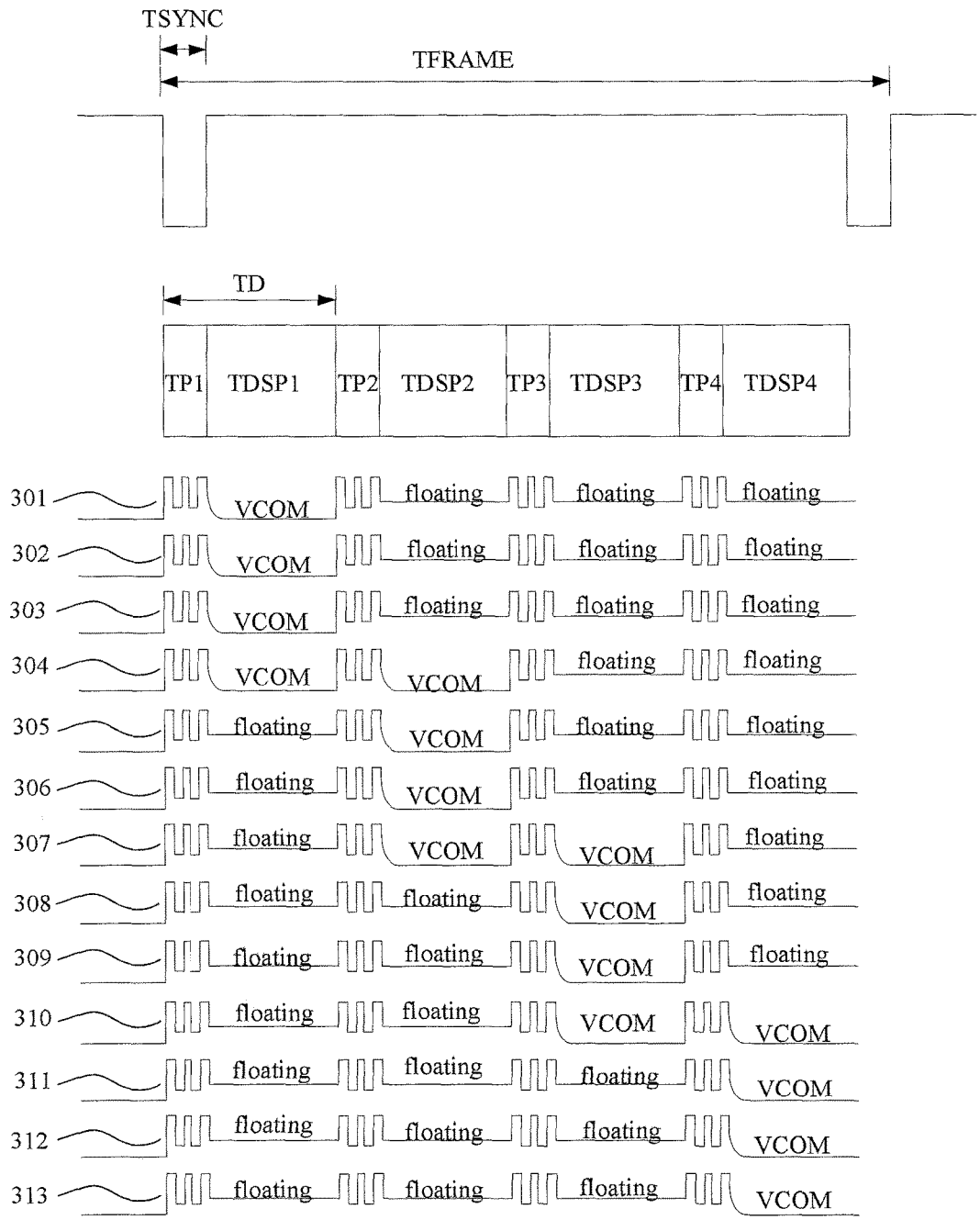
FIG. 3 shows driving waveforms of an in-cell touch display according to a preferred embodiment of the present invention.

FIG. 3 shows driving waveforms of an in-cell touch display according to a preferred embodiment of the present invention. Referring to FIG. 3, assuming that the in-cell touch panel has the resolution of 1080×1920. As shown in FIG. 3, one frame period TFRAME is divided into 4 display/touch detection sub-periods TD, that is, 4 touch detection sub-periods TP and 4 display sub-periods TDSP. It is assumed that all the display sub-periods TDSP have the same length, and this represents that 480 scan lines on average need to be driven in each display sub-period TDSP. The $1^{st}$ to $480^{th}$ scan lines are driven in the display sub-period TDSP of the first display/touch detection sub-period TD. The $481^{st}$ to $960^{th}$ scan lines are driven in the display sub-period TDSP of the second display/touch detection sub-period TD. The $961^{st}$ to $1440^{th}$ scan lines are driven in the display sub-period TDSP of the third display/touch detection sub-period TD. The $1441^{st}$ to $1920^{th}$ scan lines are driven in the display sub-period TDSP of the fourth display/touch detection sub-period TD.

Figure 4:
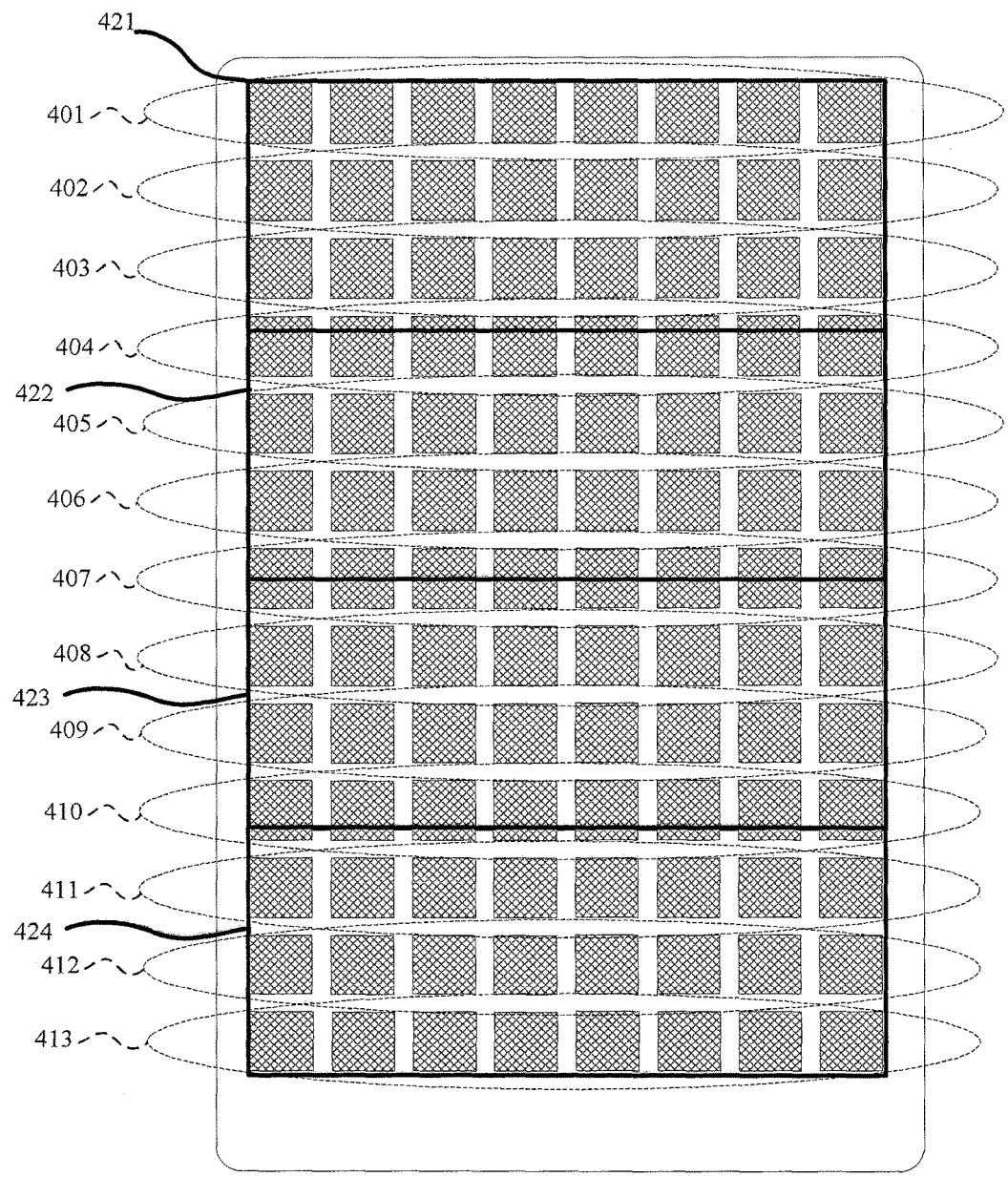
FIG. 4 is a schematic view showing driving of an in-cell touch display according to a preferred embodiment of the present invention.

FIG. 4 is a schematic view showing driving of an in-cell touch display according to a preferred embodiment of the present invention. Referring to FIG. 4, the scan lines in this embodiment are divided into 4 sets 421 to 424 corresponding to the display sub-periods TDSP1 to TDSP4 of 4 display/touch detection sub-periods TD. In addition, because there are 13 rows of touch sensors 401 to 413 in total, all the first to fourth rows of touch sensors 401 to 404 must be set to the display common voltage VCOM in the display sub-period TDSP1 of the first display/touch detection sub-period TD, all the fourth to seventh rows of touch sensors 404 to 407 must be set to the display common voltage VCOM in the display sub-period TDSP2 of the second display/touch detection sub-period TD, all the seventh to tenth rows of touch sensors 407 to 410 must be set to the display common voltage VCOM in the display sub-period TDSP3 of the third display/touch detection sub-period TD, and all the tenth to thirteenth rows of touch sensors 410 to 413 must be set to the display common voltage VCOM in the display sub-period TDSP4 of the fourth display/touch detection sub-period TD.

Referring back to FIG. 3, reference number 301 represents the waveform of the display-driving and touch integrated circuit 202 supplied to the first row of touch sensors 401; reference number 302 represents the waveform of the display-driving and touch integrated circuit 202 supplied to the second row of touch sensors 402; and reference number 303 represents the waveform of the display-driving and touch integrated circuit 202 supplied to the third row of touch sensors 403. The subsequent arrangement can be obtained by those skilled in the art in a similar manner.

In this embodiment, the display-driving and touch integrated circuit 202 may firstly judge the touch sensors needing to be supplied with the display common voltage VCOM as the first to fourth rows of touch sensors 401 to 404 according to the scanned $1^{st}$ to $480^{th}$ scan lines before the display sub-period TDSP1 of the first display/touch detection sub-period TD. Thereafter, the display-driving and touch integrated circuit 202 directly supplies the display common voltage VCOM to the first to fourth rows of touch sensors 401 to 404, and keeps the other fifth to thirteenth rows of touch sensors 405 to 413 at the floating voltages in the display sub-period TDSP1 of the first display/touch detection sub-period TD. Similarly, the display-driving and touch integrated circuit 202 may firstly judge the touch sensors needing to be supplied with the display common voltage VCOM as the fourth to seventh rows of touch sensors 404 to 407 according to the scanned $481^{st}$ to $960^{th}$ scan lines before the display sub-period TDSP2 of the second display/touch detection sub-period TD. Thereafter, the display-driving and touch integrated circuit 202 directly supplies a display common voltage VCOM to the fourth to seventh rows of touch sensors 404 to 407 in the display sub-period TDSP2 of the display/touch detection sub-period TD, and keeps the first to third rows of touch sensors 401 to 403 and eighth to thirteenth rows of touch sensors 408 to 413 at the floating voltages.

The display-driving and touch integrated circuit 202 judges the touch sensors needing to be supplied with the display common voltage VCOM as the seventh to tenth rows of touch sensors 407 to 410 according to the scanned $961^{st}$ to $1440^{th}$ scan lines before the display sub-period TDSP3 of the third display/touch detection sub-period TD. Thereafter, the display-driving and touch integrated circuit 202 directly supplies a display common voltage VCOM to the seventh to tenth rows of touch sensors 407 to 410, and keeps the other first to sixth rows of touch sensors 401 to 406 and eleventh to thirteenth rows of touch sensors 411 to 413 at the floating voltages in the display sub-period TDSP3 of the third display/touch detection sub-period TD. Similarly, the display-driving and touch integrated circuit 202 judges the touch sensors needing to be supplied with the display common voltage VCOM as the tenth to thirteenth rows of touch sensors 410 to 413 according to the scanned $1441^{st}$ to $1920^{th}$ scan lines before the display sub-period TDSP4 of the fourth display/touch detection sub-period TD. Thereafter, the display-driving and touch integrated circuit 202 directly supplies a display common voltage VCOM to the tenth to thirteenth rows of touch sensors 410 to 413, and keeps the first to ninth rows of touch sensors 401 to 409 at the floating voltages in the display sub-period TDSP4 of the fourth display/touch detection sub-period TD.

Figure 5:
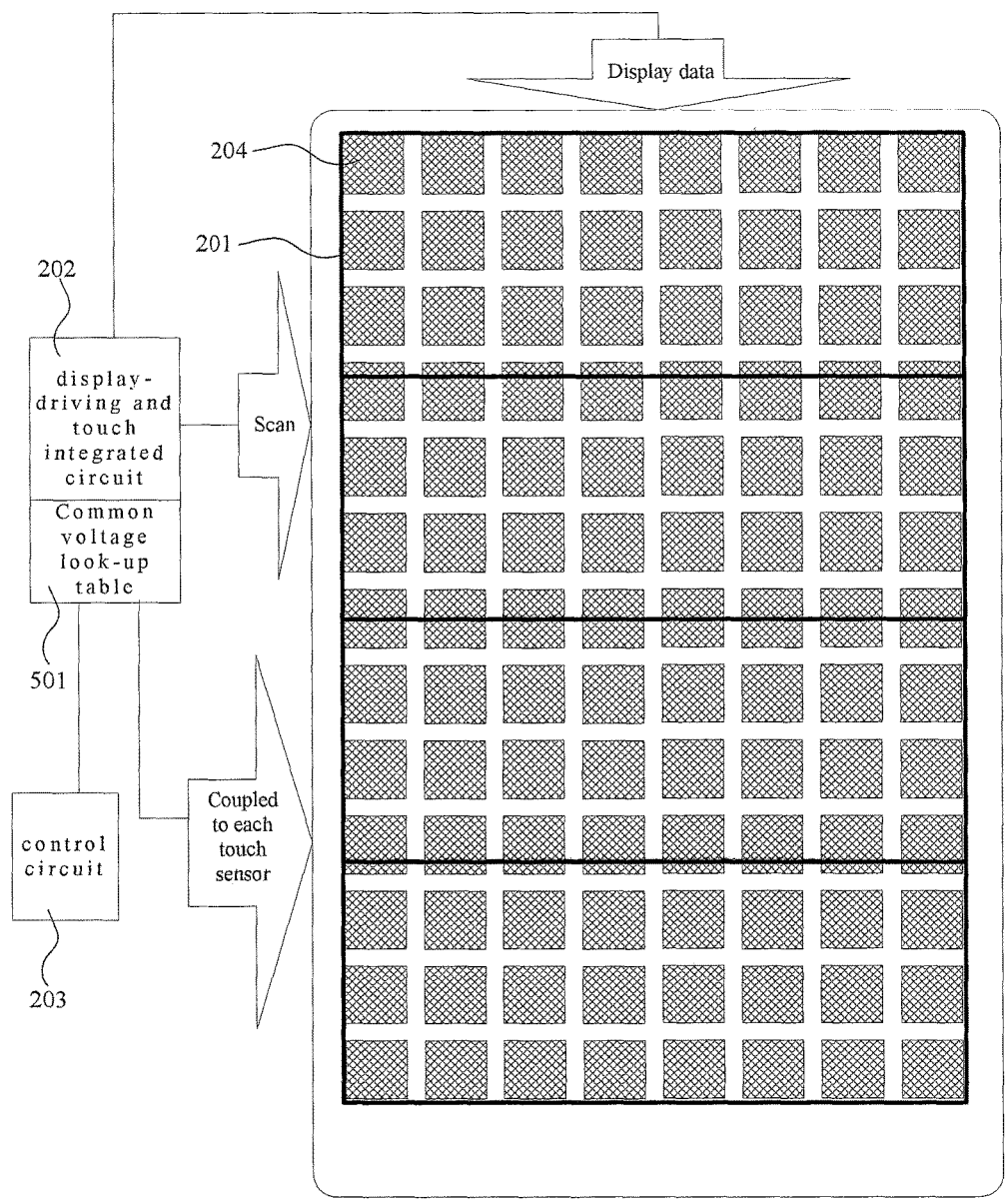
FIG. 5 is a circuit diagram showing a mobile device according to a preferred embodiment of the present invention.

In the above-mentioned exemplary embodiment, the display-driving and touch integrated circuit 202 judges the touch sensors needing to be supplied with the display common voltage VCOM according to the scan line being scanned before the display sub-periods TDSP1 to TDPS4 of each display/touch detection sub-period TD. However, if the judging operations of the display-driving and touch integrated circuit 202 need to be decreased, the judgement may also be omitted in the following embodiment. FIG. 5 is a circuit diagram showing a mobile device according to a preferred embodiment of the present invention. Referring to FIG. 5, the display-driving and touch integrated circuit 202 of this embodiment has a common voltage look-up table 501, which records the corresponding relationship between an index number of the display/touch detection sub-period and the touch sensor. In this embodiment, the index number of the first display/touch detection sub-period TD is 1, the index number of the second display/touch detection sub-period TD is 2, the index number of the third display/touch detection sub-period TD is 3, and the index number of the fourth display/touch detection sub-period TD is 4. The contents of the common voltage look-up table 501 are substantially listed in Table 1.

TABLE 1

| DISPLAY/TOUCH DETECTION SUB-PERIOD | TOUCH SENSOR |
|---|---|
| 1 | (1, 1) to (8, 1) |
|  | (1, 2) to (8, 2) |
|  | (1, 3) to (8, 3) |
|  | (1, 4) to (8, 4) |

TABLE 1-continued

| DISPLAY/TOUCH DETECTION SUB-PERIOD | TOUCH SENSOR |
|---|---|
| 2 | (1, 4) to (8, 4) |
|   | (1, 5) to (8, 5) |
|   | (1, 6) to (8, 6) |
|   | (1, 7) to (8, 7) |
| 3 | (1, 7) to (8, 7) |
|   | (1, 8) to (8, 8) |
|   | (1, 9) to (8, 9) |
|   | (1, 10) to (8, 10) |
| 4 | (1, 10) to (8, 10) |
|   | (1, 11) to (8, 11) |
|   | (1, 12) to (8, 12) |
|   | (1, 13) to (8, 13) |

In Table 1, (1, 1) represents that the touch sensor has the X coordinate equal to 1, and the Y coordinate equal to 1. For example, the seventh rows of touch sensors counted from top to bottom have the Y coordinates equal to 7. As listed in Table 1, the display-driving and touch integrated circuit 202 substitutes the index number (1) of the first display/touch detection sub-period TD into the common voltage look-up table 501 of Table 1 before the display sub-period TDSP1 of the first display/touch detection sub-period TD to obtain that the touch sensors (1, 1) to (8, 4) need to be supplied with the display common voltage VCOM. Thus, when the touch detection sub-period TP1 of the first display/touch detection sub-period TD ends, the display-driving and touch integrated circuit 202 supplies the display common voltage VCOM to the touch sensors (1, 1) to (8, 4). The display-driving and touch integrated circuit 202 substitutes the index number (2) of the second display/touch detection sub-period TD into the common voltage look-up table 501 of Table 1 before the display sub-period TDSP2 of the second display/touch detection sub-period TD to obtain that the touch sensors (1, 4) to (8, 7) need to be supplied with the display common voltage VCOM. Thus, when the touch detection sub-period TP2 of the second display/touch detection sub-period TD ends, the display-driving and touch integrated circuit 202 supplies the display common voltage VCOM to the touch sensors (1, 4) to (8, 7).

The display-driving and touch integrated circuit 202 substitutes the index number (3) of the third display/touch detection sub-period TD into the common voltage look-up table 501 of Table 1 before the display sub-period TDSP3 of the third display/touch detection sub-period TD to obtain that all the touch sensors (1, 7) to (8, 10) need to be supplied with the display common voltage VCOM. Thus, when the touch detection sub-period TP3 of the third display/touch detection sub-period TD ends, the display-driving and touch integrated circuit 202 supplies the display common voltage VCOM to the touch sensors (1, 7) to (8, 10). The display-driving and touch integrated circuit 202 substitutes the index number (4) of the second display/touch detection sub-period TD into the common voltage look-up table 501 of Table 1 before the display sub-period TDSP4 of the fourth display/touch detection sub-period TD to obtain that the touch sensors (1, 10) to (8, 13) need to be supplied with the display common voltage VCOM. Thus, when the touch detection sub-period TP4 of the fourth display/touch detection sub-period TD ends, the display-driving and touch integrated circuit 202 supplies the display common voltage VCOM to the touch sensors (1, 10) to (8, 13).

After comparing the embodiment with the prior art, those skilled in the art can obtain that only some touch sensors 204 are set to the display common voltage in each display sub-period in the embodiment of the present invention. Because the display-driving and touch integrated circuit 202 only needs to drive some of the touch sensors 204, the load is relatively reduced, and the settling time is also significantly shortened so that the use of the line buffers is decreased.

In the above-mentioned embodiment, although 8×13 touch sensors 204 are described as an example, those skilled in the art should know that the number of the touch sensors 204 is designed according to different applications or panel sizes. Thus, the present invention is not restricted thereto. In addition, although the resolution of 1080×1920 of the panel is described as an example in the above-mentioned embodiment, those skilled in the art should know that the resolution of the panel is designed according to different applications and different specifications in an optional manner. Thus, the invention is not restricted thereto. Furthermore, although the common voltage look-up table 501 is implemented in the form of a table in the above-mentioned embodiment, those skilled in the art should know that the common voltage look-up table 501 may also be implemented in the form of a program loop. Thus, the present invention is not restricted thereto. Moreover, although the common voltage look-up table 501 is generated according to the corresponding relationship between the index numbers of the display/touch detection sub-periods TD and the touch sensors, those skilled in the art should know that the look-up table may be generated according to the data having the corresponding relationship with the touch sensors upon operation. For example, the data may be the index number of the scan line in the display/touch detection sub-period TD. So, the present invention is not restricted thereto.

Figure 6:
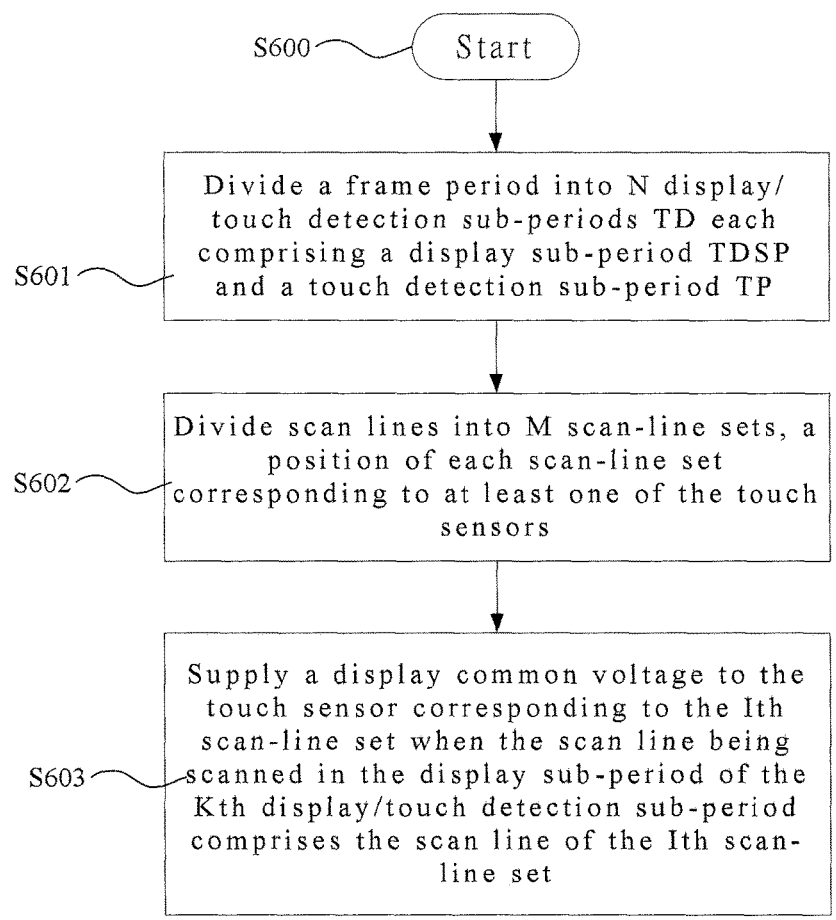
FIG. 6 is a flow chart showing a driving method for a touch display device according to a preferred embodiment of the present invention.

FIG. 6 is a flow chart showing a driving method for a touch display device according to a preferred embodiment of the present invention. Referring to FIG. 6, the driving method for the in-cell touch display comprises the following steps.

In step S600, the method starts.

In step S601, a frame period is divided into N display/touch detection sub-periods TD each comprising a display sub-period TDSP and a touch detection sub-period TP.

In step S602, scan lines are divided into M scan-line sets. A position of each of the scan-line sets corresponds to at least one of the touch sensors.

In step S603, when the scan line being scanned in the display sub-period of the $K^{th}$ display/touch detection sub-period comprises the scan line of the $I^{th}$ scan-line set, a display common voltage is supplied to the touch sensor corresponding to the $I^{th}$ scan-line set.

Figure 7:
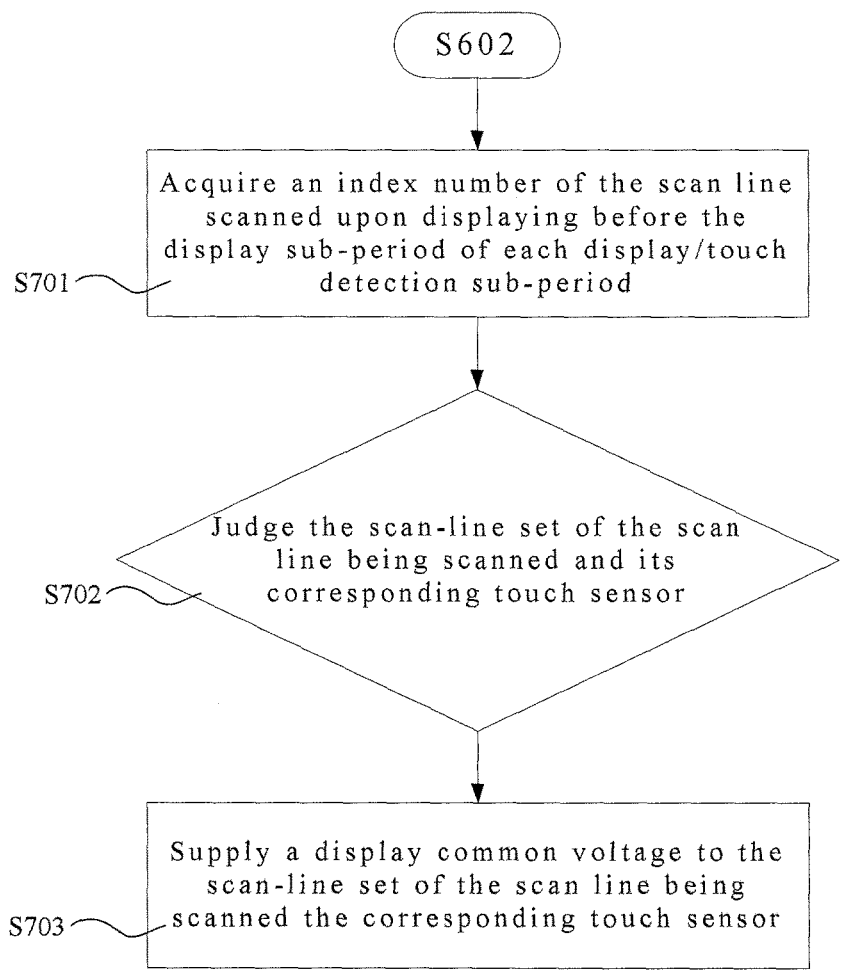
FIG. 7 is a flow chart showing sub-steps of step S603 in the driving method for the touch display device adopting the judgement according to a preferred embodiment of the present invention.

Also, the step S603 may be implemented in two ways. The first way is to adopt the judgement. FIG. 7 is a flow chart showing sub-steps of the step S603 in the driving method for the touch display device adopting the judgement according to a preferred embodiment of the invention. Referring to FIG. 7, the step S603 comprises the following sub-steps.

In step S701, the information of the scan lines being scanned upon displaying is acquired before the display sub-period of each display/touch detection sub-period, wherein the information may be, for example but without limitation to, the index numbers of the scan lines. For example, in the display sub-period TDSP3 of the third display/touch detection sub-period, the scan lines being scanned are $961^{st}$ to $1440^{th}$ scan lines. The index numbers thereof may be 961 to 1440, for example.

In step S702, the scan-line set of the scan line being scanned and its corresponding touch sensors are judged.

Next, the position coordinates of the touch electrodes corresponding to the 961$^{st}$ to 1440$^{th}$ scan lines are judged by way of judgement.

In step S703, the display common voltage VCOM is supplied to the touch sensor corresponding to the scan-line set of the scan line being scanned.

Figure 8:
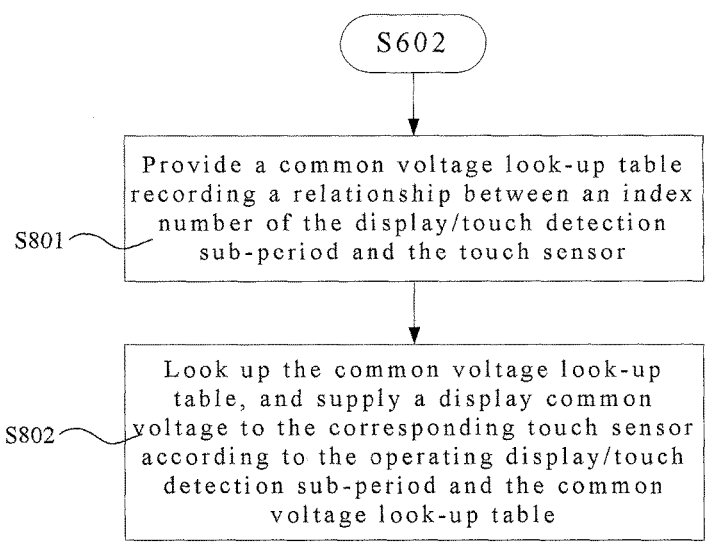
FIG. 8 is a flow chart showing sub-steps of the step S603 in the driving method for the touch display device, which does not adopt the judgement, according to a preferred embodiment of the present invention.

FIG. 8 is a flow chart showing sub-steps of the step S603 in the driving method for the touch display device, which does not adopt the judgement, according to a preferred embodiment of the present invention. Referring to FIG. 8, the step S603 comprises the following sub-steps.

In step S801, a common voltage look-up table is provided. The common voltage look-up table records a relationship between an index number of the display/touch detection sub-period and the touch sensor. The look-up table may be implemented according to Table 1 or by way of program loop or the like.

In step S802, the common voltage look-up table is looked up, and the display common voltage is provided to the corresponding touch sensor according to the operating display/touch detection sub-period and the common voltage look-up table.

In the above-mentioned exemplary embodiment, the scan lines are grouped, and the touch sensors 204 corresponding to the scan lines are set to the display common voltage VCOM in the display sub-period TDSP. In the following embodiment, the touch sensors 204 are grouped instead of the scan lines.

Figure 9:
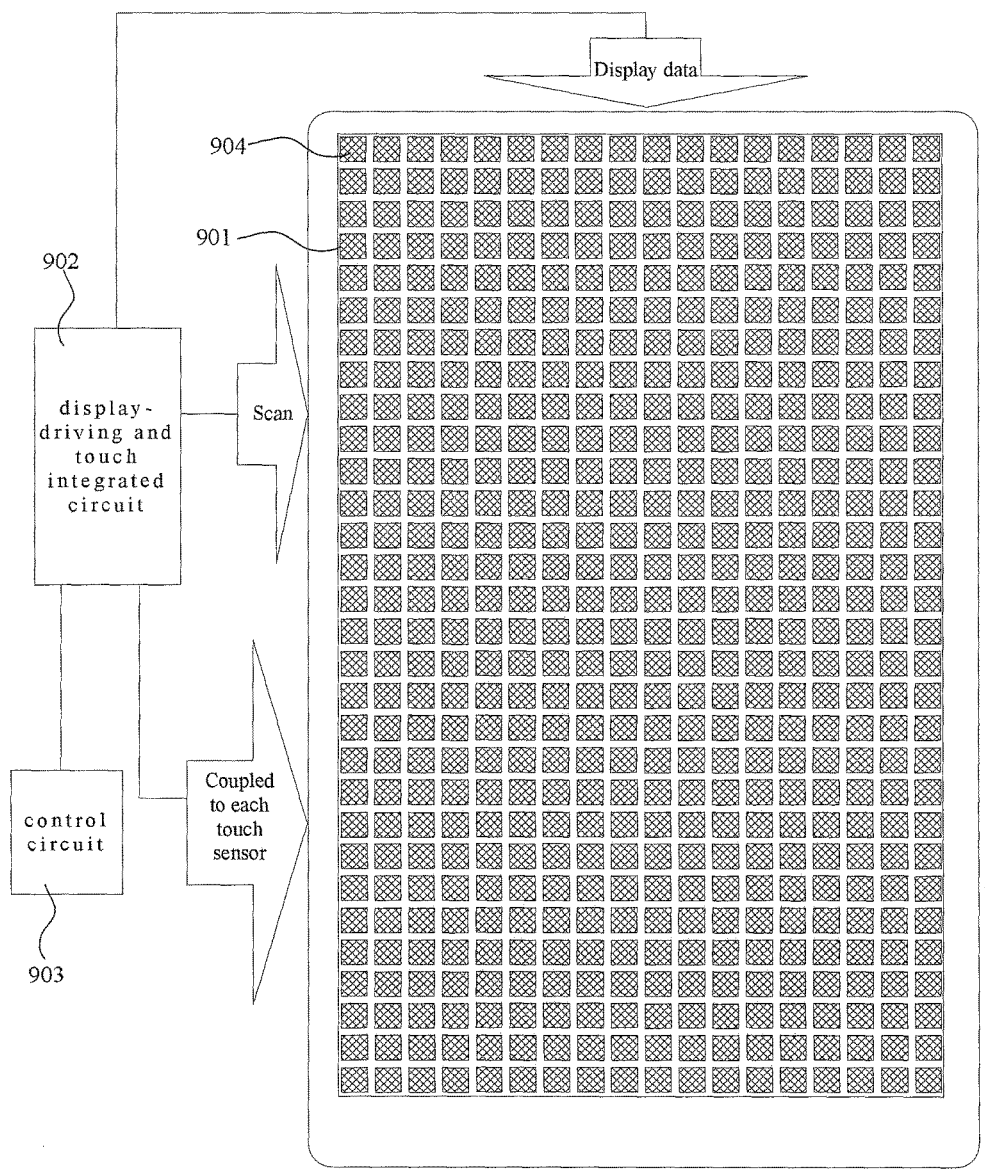
FIG. 9 is a circuit diagram showing a mobile device according to a preferred embodiment of the present invention.

FIG. 9 is a circuit diagram showing a mobile device according to a preferred embodiment of the invention. Referring to FIG. 9, In this embodiment, the mobile device comprises an in-cell touch display 901, a display-driving and touch integrated circuit 902 and a control circuit 903. The control circuit 903 controls the display-driving and touch integrated circuit 902 to perform the display according to the user's operation. The in-cell touch panel 901 comprises 540 touch sensors 904 (18×30 touch sensors 904). In this embodiment, the self-capacitance touch sensor is described as an example, but the present invention is not restricted thereto. Each touch sensor 904 is coupled to the display-driving and touch integrated circuit 902. In addition, the display-driving and, touch integrated circuit 902 may further performs the driving of the scan lines and the driving of the display data.

Figure 10:
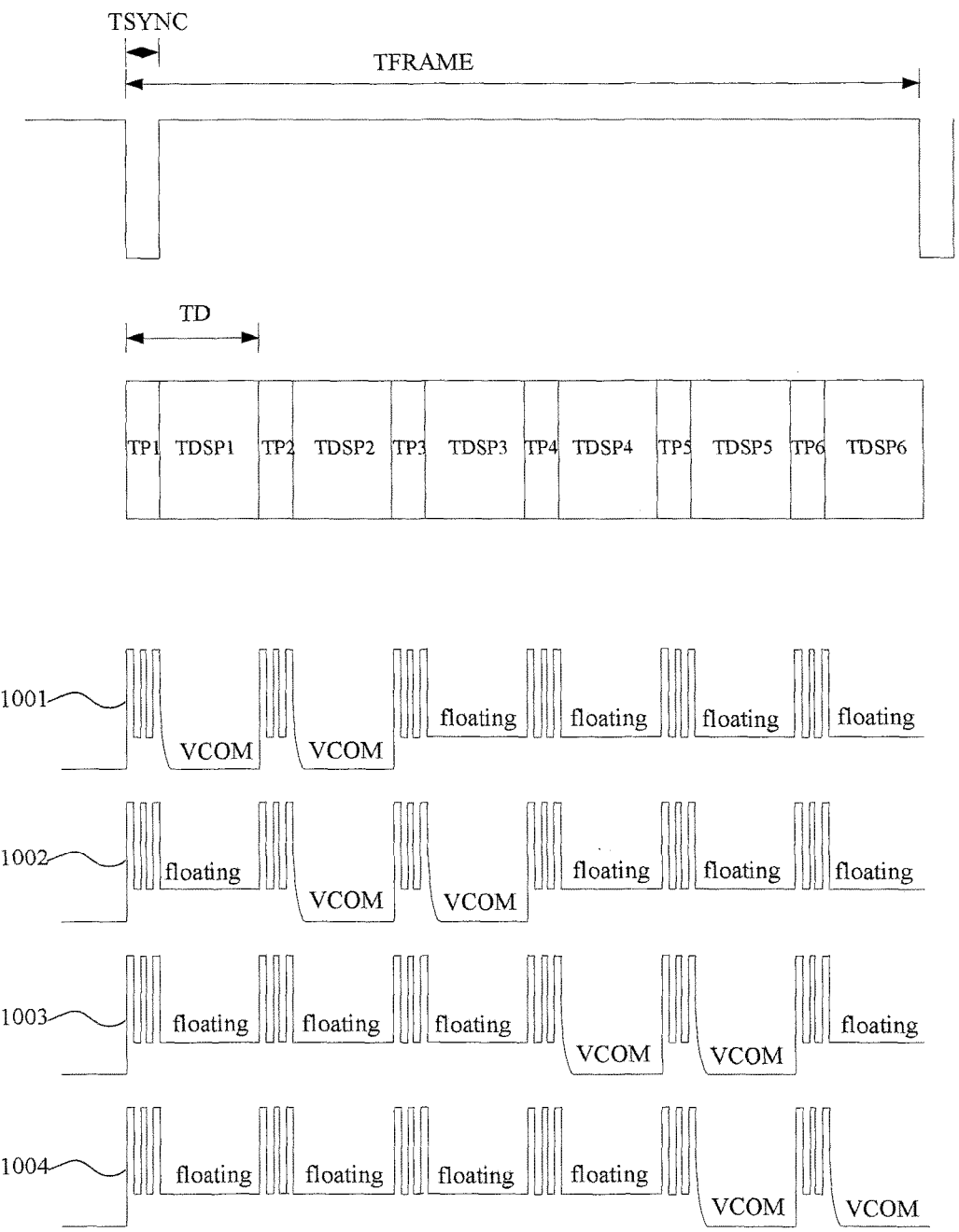
FIG. 10 shows driving waveforms of an in-cell touch display according to a preferred embodiment of the present invention.

FIG. 10 shows driving waveforms of an in-cell touch display according to a preferred embodiment of the present invention. Referring to FIG. 10, it is similarly assumed that the in-cell touch display has the resolution of 1080×1920. As shown in FIG. 10, one frame period TFRAME is divided into 6 display/touch detection sub-periods TD, that is, 6 touch detection sub-periods TP1 to TP6 and 6 display sub-periods TDSP1 to TDSP6. It is assumed that the display sub-periods TDSP1 to TDSP6 have the same length, and this represents that each of the display sub-periods TDSP1 to TDSP6 needs to drive 320 scan lines on average. For example, the 1$^{st}$ to 320$^{th}$ scan lines are driven in the display sub-period TDSP1 of the first display/touch detection sub-period TD; the 321$^{st}$ to 640$^{th}$ scan lines are driven in the display sub-period TDSP2 of the second display/touch detection sub-period TD; the 641$^{st}$ to 960$^{th}$ scan lines are driven in the display sub-period TDSP3 of the third display/touch detection sub-period TD; the 961$^{st}$ to 1280$^{th}$ scan lines are driven in the display sub-period TDSP4 of the fourth display/touch detection sub-period TD; the 1281$^{st}$ to 1600$^{th}$ scan lines are driven in the display sub-period TDSP5 of the fifth display/touch detection sub-period TD; and the 1601$^{st}$ to 1920$^{th}$ scan lines are driven in the display sub-period TDSP6 of the sixth display/touch detection sub-period TD.

Figure 11:
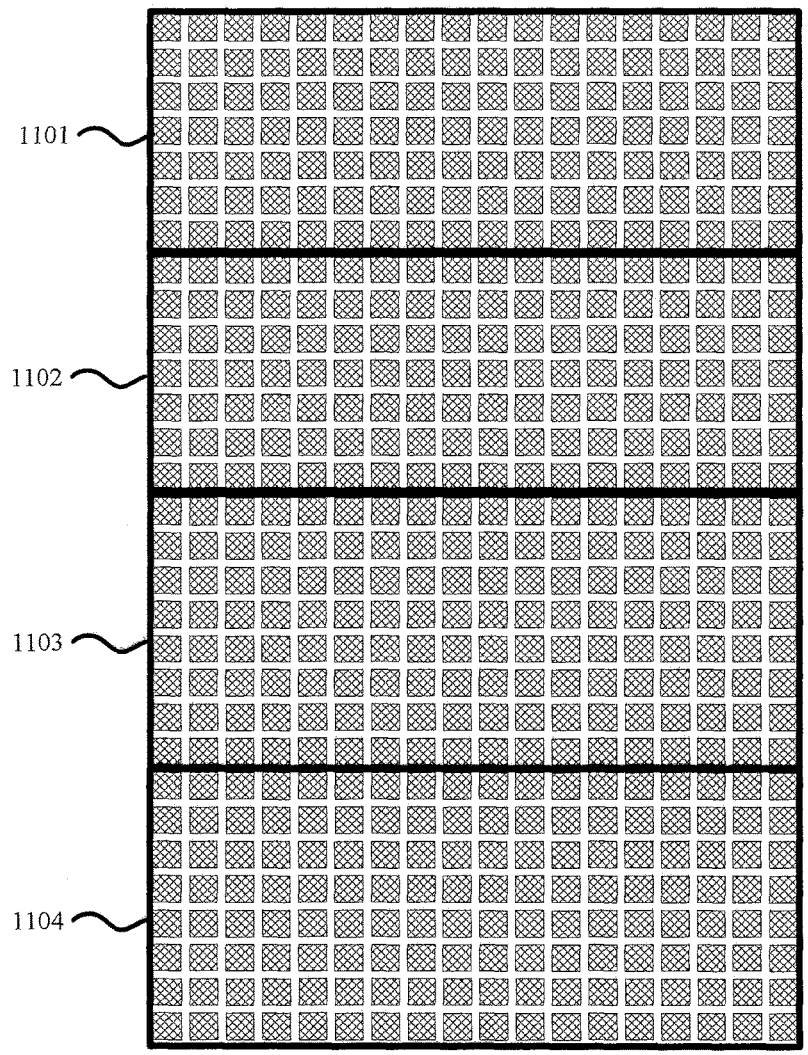
FIG. 11 is a schematic view showing driving of an in-cell touch display according to a preferred embodiment of the present invention.

FIG. 11 is a schematic view showing driving of an in-cell touch display according to a preferred embodiment of the present invention. Referring to FIG. 11, the touch sensors 904 of this embodiment are divided into four touch sensor sets 1101 to 1104. In addition, there are 30 rows of touch sensors in total in this embodiment, so there are seven rows of touch sensors allocated to the first touch sensor set 1101, seven rows of touch sensors allocated to the second touch sensor set 1102, eight rows of touch sensors allocated to the third touch sensor set 1103, and eight rows of touch sensors allocated to the fourth touch sensor set 1104.

Regarding the operation, the touch sensors are grouped, so the scanned scan lines in the display sub-period TDSP1 of the first display/touch detection sub-period TD are the 1$^{st}$ to 320$^{th}$ scan lines, which are disposed at the positions corresponding to the first touch sensor set 1101, so only the first touch sensor set 1101 needs to be set to the display common voltage VCOM. In the display sub-period TDSP2 of the second display/touch detection sub-period TD, the scanned scan lines are the 321$^{st}$ to 640$^{th}$ scan lines, which are disposed at positions corresponding to the first touch sensor set 1101 and the second touch sensor set 1102, so the first touch sensor set 1101 and the second touch sensor set 1102 need to be set to the display common voltage VCOM. In the display sub-period TDSP3 of the third display/touch detection sub-period TD, the scanned scan lines are the 641$^{st}$ to 960$^{th}$ scan lines, which are disposed at positions corresponding to the second touch sensor set 1102, so only the second touch sensor set 1102 needs to be set to the display common voltage VCOM.

In the display sub-period TDSP4 of the fourth display/touch detection sub-period TD, the scanned scan lines are the 961$^{st}$ to 1280$^{th}$ scan lines, which are disposed at the positions corresponding to the third touch sensor set 1103, so only the third touch sensor set 1103 needs to be set to the display common voltage VCOM. In the display sub-period TDSP5 of the fifth display/touch detection sub-period TD, the scanned scan lines are the 1281$^{st}$ to 1600$^{th}$ scan lines, which are disposed at positions corresponding to the third touch sensor set 1103 and the fourth touch sensor set 1104, so the third touch sensor set 1103 and the fourth touch sensor set 1104 need to be set to the display common voltage VCOM. In the display sub-period TDSP6 of the sixth display/touch detection sub-period TD, the scanned scan lines are the 1601$^{st}$ to 1920$^{th}$ scan lines, which are disposed at the positions corresponding to the fourth touch sensor set 1104, so only the fourth touch sensor set 1104 needs to be set to the display common voltage VCOM.

Referring back to FIG. 10, reference number 1001 represents the waveform of the display-driving and touch integrated circuit 902 supplied to the first touch sensor set 1101; reference number 1002 represents the waveform of the display-driving and touch integrated circuit 902 supplied to the second touch sensor set 1102; reference number 1003 represents the waveform of the display-driving and touch integrated circuit 902 supplied to the third touch sensor set 1103; and reference number 1004 represents the waveform of the display-driving and touch integrated circuit 902 supplied to the fourth touch sensor set 1104.

In this embodiment, the display-driving and touch integrated circuit 902 may firstly judge the touch sensors needing to be supplied with the display common voltage VCOM as the first touch sensor set 1101 according to the positions of the scanned 1$^{st}$ to 320$^{th}$ scan lines before the display sub-period TDSP1 of the first display/touch detection sub-period TD. Thereafter, the display-driving and touch integrated circuit 902 directly supplies a display common voltage VCOM to the first touch sensor set 1101, and keeps the second to fourth touch sensor sets 1102 to 1104 at the floating voltages in the display sub-period TDSP1 of the first display/touch detection sub-period TD. Similarly, before the display sub-period TDSP2 of the second display/touch detection sub-period TD, the display-driving and touch integrated circuit 902 may judge the touch sensor sets needing to be supplied with the display common voltage VCOM as the first touch sensor set 1101 and the second touch sensor set 1102 according to the positions of the scanned $321^{st}$ to $640^{th}$ scan lines. Thereafter, the display-driving and touch integrated circuit 902 directly supplies the display common voltage VCOM to the first touch sensor set 1101 and the second touch sensor set 1102, and keeps the third touch sensor set 1103 and the fourth touch sensor set 1104 at the floating voltages in the display sub-period TDSP2 of the second display/touch detection sub-period TD.

Before the display sub-period TDSP3 of the third display/touch detection sub-period TD, the display-driving and touch integrated circuit 902 judges the touch sensor set needing to be supplied with the display common voltage VCOM as the second touch sensor set 1102 according to the positions of the scanned $641^{st}$ to $960^{th}$ scan lines. Thereafter, the display-driving and touch integrated circuit 902 directly supplies the display common voltage VCOM to the second touch sensor set 1102, and keeps the other first touch sensor set 1101, the third touch sensor set 1103 and the fourth touch sensor set 1104 at the floating voltages in the display sub-period TDSP3 of the third display/touch detection sub-period TD. Before the display sub-period TDSP4 of the fourth display/touch detection sub-period TD, the display-driving and touch integrated circuit 902 may judge the touch sensor set needing to be supplied with the display common voltage VCOM as the third touch sensor set 1103 according to the positions of the scanned $961^{st}$ to $1280^{th}$ scan lines. Thereafter, the display-driving and touch integrated circuit 902 directly supplies the display common voltage VCOM to the third touch sensor set 1103, and keeps the first touch sensor set 1101, the second touch sensor set 1102 and the fourth touch sensor set 1104 at the floating voltages in the display sub-period TDSP4 of the fourth display/touch detection sub-period TD.

Before the display sub-period TDSP5 of the fifth display/touch detection sub-period TD, the display-driving and touch integrated circuit 902 firstly judges the touch sensor sets needing to be supplied with the display common voltage VCOM as the third touch sensor set 1103 and the fourth touch sensor set 1104 according to the positions of the scanned $1281^{st}$ to $1600^{th}$ scan lines. Thereafter, the display-driving and touch integrated circuit 902 directly supplies the display common voltage VCOM to the third touch sensor set 1103 and the fourth touch sensor set 1104, and keeps the first touch sensor set 1101 and the second touch sensor set 1102 at the floating voltages in the display sub-period TDSP5 of the fifth display/touch detection sub-period TD. Before the display sub-period TDSP6 of the sixth display/touch detection sub-period TD, the display-driving and touch integrated circuit 902 may judge the touch sensor set needing to be supplied with the display common voltage VCOM as the fourth touch sensor set 1104 according to the positions of the scanned $1601^{st}$ to $1920^{th}$ scan lines. Thereafter, the display-driving and touch integrated circuit 902 directly supplies the display common voltage VCOM to the fourth touch sensor set 1104, and keeps the first touch sensor set 1101, the second touch sensor set 1102 and the third touch sensor set 1103 at the floating voltages in the display sub-period TDSP6 of the sixth display/touch detection sub-period TD.

Figure 12:
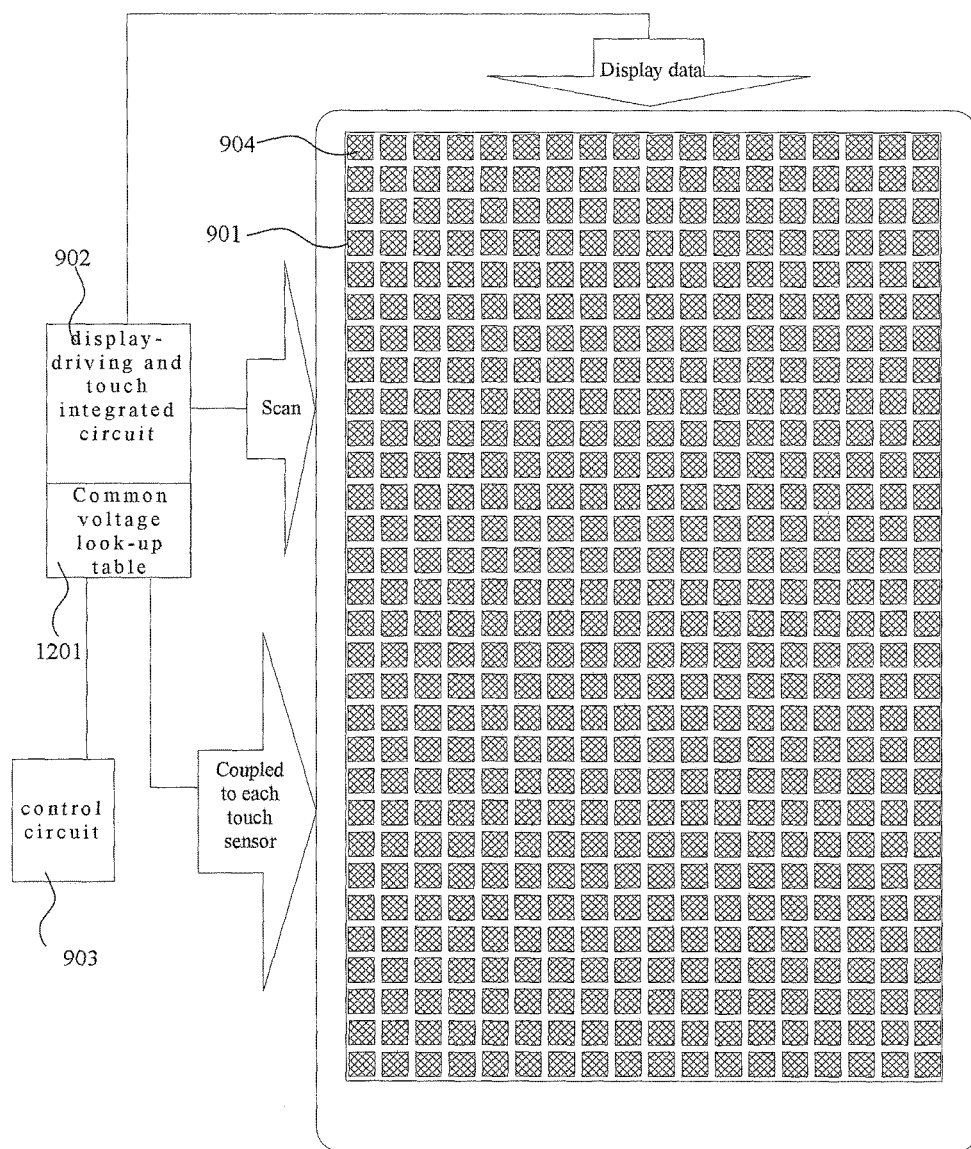
FIG. 12 is a circuit diagram showing a mobile device according to a preferred embodiment of the present invention.

In this exemplary embodiment, the display-driving and touch integrated circuit 902 judges the touch sensor set needing to be supplied with the display common voltage VCOM according to the positions of the scan lines being scanned before the display sub-period TDSP of each display/touch detection sub-period TD. However, if the computation of the display-driving and touch integrated circuit 902 is to be decreased, the display-driving and touch integrated circuit 902 may also discard the judgement in the following embodiment. FIG. 12 is a circuit diagram showing a mobile device according to a preferred embodiment of the present invention. Referring to FIG. 12, the display-driving and touch integrated circuit 902 of this embodiment has a common voltage look-up table 1201, which records a relationship between an index number of the display/touch detection sub-period and the touch sensor set. In this embodiment, the index number of the first display/touch detection sub-period TD is 1, the index number of the second display/touch detection sub-period TD is 2, the index number of the third display/touch detection sub-period TD is 3, the index number of the fourth display/touch detection sub-period TD is 4, the index number of the fifth display/touch detection sub-period TD is 5, and the index number of the sixth display/touch detection sub-period TD is 6. The contents of the common voltage look-up table 1201 are substantially listed in Table 2.

TABLE 2

| DISPLAY/TOUCH DETECTION SUB-PERIOD | TOUCH SENSOR |
| --- | --- |
| 1 | first touch sensor set |
| 2 | first touch sensor set second touch sensor set |
| 3 | second touch sensor set |
| 4 | third touch sensor set |
| 5 | third touch sensor set fourth touch sensor set |
| 6 | fourth touch sensor set |

As listed in Table 2, the display-driving and touch integrated circuit 902 firstly substitutes the index number 1 of the first display/touch detection sub-period TD into the common voltage look-up table 1201 of Table 2 before the display sub-period TDSP1 of the first display/touch detection sub-period TD to obtain the first touch sensor set 1101 needing to be supplied with the display common voltage VCOM. Thus, when the touch detection sub-period TP1 of the first display/touch detection sub-period TO ends, the display-driving and touch integrated circuit 902 supplies the display common voltage VCOM to the first touch sensor set 1101. Similarly, the display-driving and touch integrated circuit 902 firstly substitutes the index number 2 of the second display/touch detection sub-period TD into the common voltage look-up table 1201 of Table 2 before the display sub-period TDSP2 of the second display/touch detection sub-period TD to obtain the first touch sensor set 1101 and the second touch sensor set 1102 needing to be supplied with the display common voltage VCOM. Thus, when the touch detection sub-period TP2 of the second display/touch detection sub-period TD ends, the display-driving and touch integrated circuit 902 supplies the display common voltage VCOM to the first touch sensor set 1101 and the second touch sensor set 1102.

The display-driving and touch integrated circuit 902 firstly substitutes the index number 3 of the third display/touch detection sub-period TD into the common voltage look-up table 1201 of Table 2 before the display sub-period TDSP3 of the third display/touch detection sub-period TD to obtain the second touch sensor set 1102 needing to be supplied with the display common voltage VCOM. Thus, when the touch detection sub-period TP3 of the third display/touch detection sub-period TD ends, the display-driving and touch integrated circuit 902 supplies the display common voltage VCOM to the second touch sensor set 1102. Similarly, the display-driving and touch integrated circuit 902 firstly substitutes the index number 4 of the fourth display/touch detection sub-period TD into the common voltage look-up table 1201 of Table 2 before the display sub-period TDSP4 of the fourth display/touch detection sub-period TD to obtain the third touch sensor set 1103 needing to be supplied with the display common voltage VCOM. Thus, when the touch detection sub-period TP4 of the fourth display/touch detection sub-period TD ends, the display-driving and touch integrated circuit 902 supplies the display common voltage VCOM to the third touch sensor set 1103.

The display-driving and touch integrated circuit 902 firstly substitutes the index number 5 of the fifth display/touch detection sub-period TD into the common voltage look-up table 1201 of Table 2 before the display sub-period TDSP5 of the fifth display/touch detection sub-period TD to obtain the third touch sensor set 1103 and the fourth touch sensor set 1104 needing to be supplied with the display common voltage VCOM. Thus, when the touch detection sub-period TP5 of the fifth display/touch detection sub-period TD ends, the display-driving and touch integrated circuit 902 supplies the display common voltage VCOM to the third touch sensor set 1103 and the fourth touch sensor set 1104. Similarly, the display-driving and touch integrated circuit 902 firstly substitutes the index number 6 of the sixth display/touch detection sub-period TD into the common voltage look-up table 1201 of Table 2 before the display sub-period TDSP6 of the sixth display/touch detection sub-period TD to obtain the fourth touch sensor set 1104 needing to be supplied with the display common voltage VCOM. Thus, when the touch detection sub-period TP6 of the sixth display/touch detection sub-period TD ends, the display-driving and touch integrated circuit 902 supplies the display common voltage VCOM to the fourth touch sensor set 1104.

In the above-mentioned embodiment, the common voltage look-up table 1201 is implemented in the form of a table, and the look-up table is generated according to the corresponding relationships between the index numbers of the display/touch detection sub-periods TD and the touch sensors. These are used for the purpose of illustrating the embodiment of the present invention, and do not intend to restrict the present invention.

Figure 13:
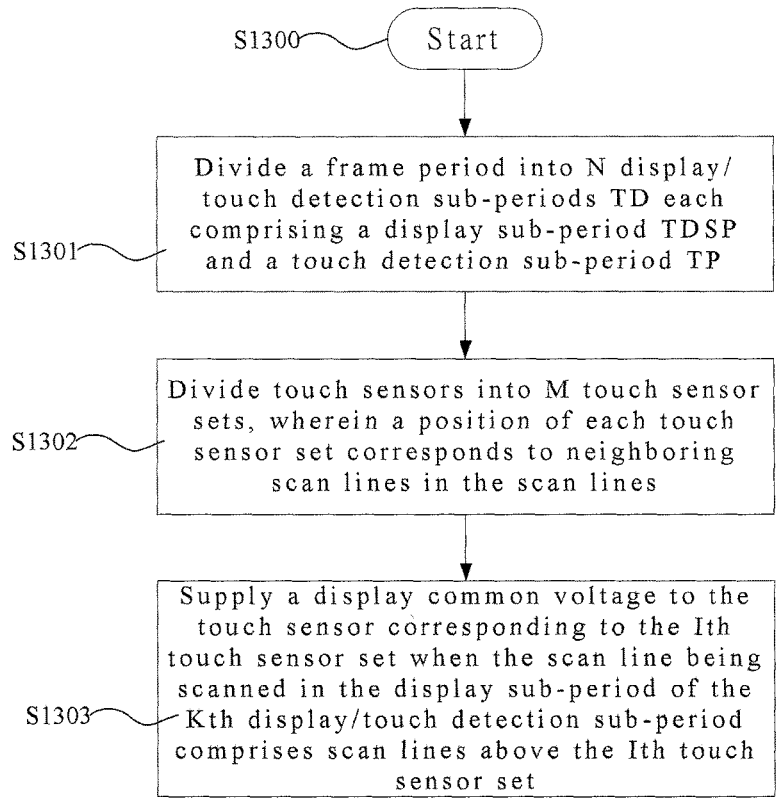
FIG. 13 is a flow chart showing a driving method for the touch display device according to a preferred embodiment of the present invention.

According to the above-mentioned embodiments, the present invention can be summarized as a driving method for an in-cell touch panel. FIG. 13 is a flow chart showing a driving method for the touch display device according to a preferred embodiment of the invention. The driving method for the in-cell touch display comprises the following steps.

In step S1300, the method starts.

In step S1301, a frame period is divided into N display/touch detection sub-periods. Also, each display/touch detection sub-period comprises a display sub-period and a touch detection sub-period.

In step S1302, the touch sensors are divided into M touch sensor sets, wherein a position of each of the touch sensor sets corresponds to neighboring scan lines in the scan lines.

In step S1303, when the scan lines being scanned in the display sub-period of the $K^{th}$ display/touch detection sub-period comprise the scan lines above the $I^{th}$ touch sensor set, a display common voltage is supplied to the touch sensor corresponding to the $I^{th}$ touch sensor set.

Figure 14:
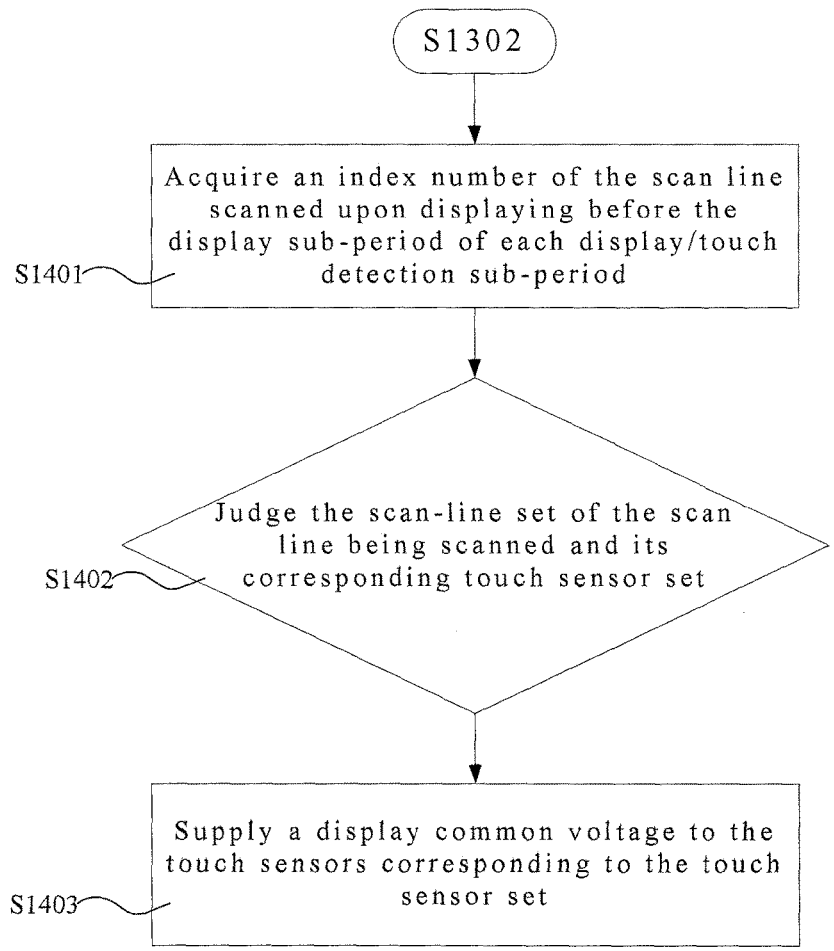
FIG. 14 is a flow chart showing sub-steps of step S1303 in the driving method for the touch display device adopting the judgement according to a preferred embodiment of the present invention.

Also, the step S1303 may be implemented in two ways. The first way is to adopt the judgement. FIG. 14 is a flow chart showing sub-steps of step S1303 in the driving method for the touch display device adopting the judgement according to a preferred embodiment of the present invention. Referring to FIG. 14, the step S1303 comprises the following sub-steps.

In step S1401, the information of the scan line being scanned upon displaying is acquired before the display sub-period of each display/touch detection sub-period, wherein the information may be, for example but without limitation to, the index numbers. For example, the scan lines being scanned are the $321^{st}$ to $640^{th}$ scan lines in the display sub-period TDSP2 of the second display/touch detection sub-period TD, and the index numbers may be 321 to 640, respectively.

In step S1402, the touch sensor set corresponding to the scan lines being scanned is judged according to the acquired index number of the scan line. The touch sensor sets below the positions of the to-be-scanned scan lines are judged as the first touch sensor set 1101 and the second touch sensor set 1102 according to the index numbers of the $321^{st}$ to $640^{th}$ scan lines.

In step S1403, the display common voltage VCOM is provided to the touch sensors corresponding to the touch sensor set.

Figure 15:
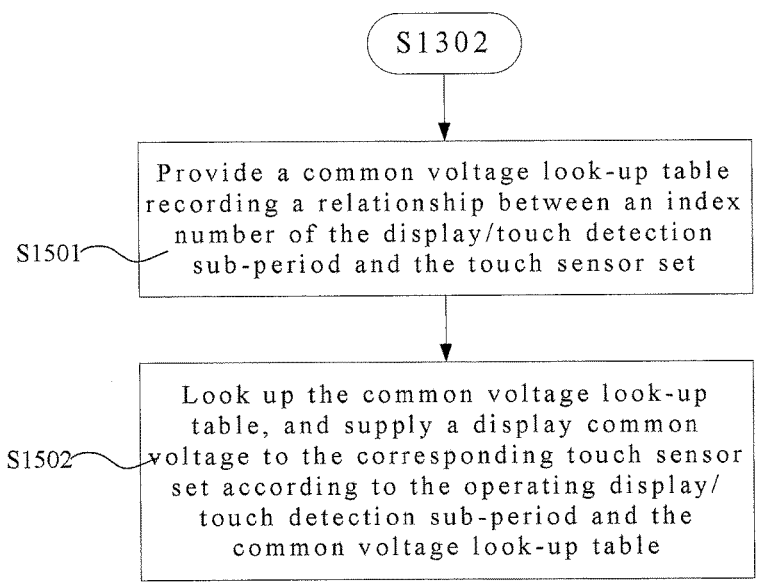
FIG. 15 is a flow chart showing sub-steps of the step S1303 in the driving method for the touch display device, which does not adopt the judgement, according to a preferred embodiment of the present invention.

FIG. 15 is a flow chart showing sub-steps of the step S1303 in the driving method for the touch display device, which does not adopt the judgement, according to a preferred embodiment of the invention. Referring to FIG. 15, the step S1303 comprises the following sub-steps.

In step S1501, a common voltage look-up table is provided. The common voltage look-up table records a relationship between an index number of the display/touch detection sub-period and the touch sensor set. The common voltage look-up table may be implemented according to Table 2 or by way of program loop or the like.

In step S1502, the display common voltage is provided to the corresponding touch sensor set according to an index number of the operating display/touch detection sub-period and the common voltage look-up table.

In summary, the essence of the present invention is to adopt the time-sharing driving method to reduce the number of the touch sensors, to which the display common voltage is supplied in each display sub-period, and to supply the common voltage to the touch sensors within the range of the scanned scan lines. Thus, the load of the display-driving and touch integrated circuit for driving the display common voltage can be reduced, so that the settling time of the display common voltage can be significantly shortened, and the requirement of the line buffer is indirectly decreased. On the other hand, the present invention may also adopt the method of grouping the touch sensors to supply a display common voltage to the corresponding touch sensor set within the range of the scan lines being scanned in each display sub-period. Thus, the load of the display-driving and touch integrated circuit for driving the display common voltage can be reduced, so that the settling time of the display common voltage can be significantly shortened, and the requirement of the line buffer is indirectly decreased.

Although the above-mentioned embodiments are described with the self-capacitance capacitive induction in-cell touch panel serving as an example, those skilled in the art should know that the mutual-capacitance capacitive induction in-cell touch panel may also be driven using the method of the present invention, so that the settling time can be shortened. Therefore, the present invention is not restricted thereto.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A driving method for an in-cell touch display, the in-cell touch display comprising an in-cell touch panel, the in-cell touch panel comprising scan lines and touch sensors, the driving method comprising the steps of:
    dividing a frame period into N display/touch detection sub-periods each comprising a display sub-period and a touch detection sub-period;
    dividing the scan lines into M scan-line sets, wherein a position of each of the scan-line sets corresponds to at least one of the touch sensors; and
    supplying a display common voltage to the touch sensor corresponding to the $I^{th}$ scan-line set and keeping the other touch sensors at floating voltage when the scan line being scanned in the display sub-period of the $K^{th}$ display/touch detection sub-period comprises the scan line of the $I^{th}$ scan-line set, such that settling time of the display common voltage is reduced,
    wherein N, M, K and I are natural numbers, K is smaller than or equal to N, and I is smaller than or equal to M.

2. The driving method according to claim 1, wherein the step of supplying the display common voltage to the touch sensor corresponding to the $I^{th}$ scan-line set when the scan line being scanned in the display sub-period of the $K^{th}$ display/touch detection sub-period comprises the scan line of the $I^{th}$ scan-line set comprises:
    acquiring an index number of the scan line scanned upon displaying before the display sub-period of the $K^{th}$ display/touch detection sub-period;
    judging the scan-line set of the scan line being scanned according to the acquired index number of the scan line before the display sub-period of the $K^{th}$ display/touch detection sub-period; and
    supplying the display common voltage to the touch sensor corresponding to the scan-line set of the scan line being scanned.

3. The driving method according to claim 1, wherein the step of supplying the display common voltage to the touch sensor corresponding to the $I^{th}$ scan-line set when the scan line being scanned in the display sub-period of the $K^{th}$ display/touch detection sub-period comprises the scan line of the $I^{th}$ scan-line set comprises:
    providing a common voltage look-up table, which records a relationship between an index number of the display/touch detection sub-period and the touch sensor; and
    supplying the display common voltage to the corresponding touch sensor according to the operating display/touch detection sub-period and the common voltage look-up table.

4. A mobile device, comprising:
    an in-cell touch panel, comprising scan lines and touch sensors; and
    an display-driving and touch integrated circuit, comprising a plurality of pins which respectively coupled to the scan lines and the touch sensors,
    wherein a frame period is divided into N display/touch detection sub-periods, wherein each of display/touch detection sub-periods comprises a display sub-period and a touch detection sub-period, wherein the scan lines are divided into M scan-line sets, wherein a position of each of the scan-line sets corresponds to at least one of the touch sensors,
    wherein the display-driving and touch integrated circuit sequentially drives the scan lines in the display sub-period of the display/touch detection sub-periods of the frame period, when the scan lines being scanned by the display-driving and touch integrated circuit in the display sub-period of the $K^{th}$ display/touch detection sub-period comprises the scan line of the $I^{th}$ scan-line set, a display common voltage is supplied to the touch sensor corresponding to the $I^{th}$ scan-line set and the other touch sensors are kept at floating voltage such that settling time of the display common voltage is reduced,
    wherein N, M, K and I are natural numbers, K is smaller than or equal to N, and I is smaller than or equal to M.

5. The mobile device according to claim 4, wherein an operation of the display-driving and touch integrated circuit in the display sub-period of the $K^{th}$ display/touch detection sub-period comprises:
    the display-driving and touch integrated circuit acquiring an index number of the scan line scanned upon displaying before the display sub-period of the $K^{th}$ display/touch detection sub-period;
    the display-driving and touch integrated circuit judging the scan-line set of the scan line being scanned according to the acquired index number of the scan line before the display sub-period of the $K^{th}$ display/touch detection sub-period; and
    the display-driving and touch integrated circuit supplying the display common voltage to the touch sensor corresponding to the scan-line set of the scan line being scanned.

6. The mobile device according to claim 4, wherein the display-driving and touch integrated circuit further comprises:
    a common voltage look-up table, which records a relationship between an index number of the display/touch detection sub-period and the touch sensor,
    wherein the display-driving and touch integrated circuit supplies the display common voltage to the corresponding touch sensor according to the operating display/touch detection sub-period and the common voltage look-up table.

* * * * *